(12) United States Patent
Leung et al.

(10) Patent No.: US 11,678,645 B1
(45) Date of Patent: Jun. 20, 2023

(54) TIGHTENING HARNESS

(71) Applicant: Launch Lab, Inc., Pasadena, CA (US)

(72) Inventors: Michael Leung, Pomona, CA (US);
Ruixi Chen, Temple City, CA (US)

( * ) Notice: Subject to any disclaimer, the term of this patent is extended or adjusted under 35 U.S.C. 154(b) by 117 days.

(21) Appl. No.: 16/945,957

(22) Filed: Aug. 3, 2020

(51) Int. Cl.
*A01K 27/00* (2006.01)
*A01K 15/02* (2006.01)

(52) U.S. Cl.
CPC ............ *A01K 27/002* (2013.01); *A01K 15/02* (2013.01); *A01K 27/005* (2013.01)

(58) Field of Classification Search
CPC .... A01K 27/002; A01K 27/005; A01K 15/02; A01K 15/04; A01K 27/00; A01K 27/001
See application file for complete search history.

(56) References Cited

U.S. PATENT DOCUMENTS

| | | | |
|---|---|---|---|
| 5,794,571 A * | 8/1998 | Goldberg | A01K 27/00 |
| 7,004,113 B1 * | 2/2006 | Zutis | A01K 15/02 |
| | | | 119/792 |
| 2019/0110438 A1* | 4/2019 | Yun | A01K 27/00 |

* cited by examiner

*Primary Examiner* — Joshua J Michener
*Assistant Examiner* — Henry Hooper Mudd
(74) *Attorney, Agent, or Firm* — David J. Wilson (57) ABSTRACT

The present invention is to a tightening or cinching harness that reversibly tightens (cinches) and relaxes as the lead is pulled and relaxed by an owner or by the animal.

15 Claims, 10 Drawing Sheets

TIGHTENING HARNESS

BACKGROUND

Animal harnesses are used to control an animal on a lead (or leash) without putting too much pressure on the animal's neck, as may happen with the typical animal collar. A harness typically wraps around the animal at the chest and ribcage. Tightness is determined when the harness is placed on the animal and cannot typically be readjusted until performed manually. Thus, while a harness is in many instances more comfortable for the animal, it does not permit the person to control the animal without excessive pulling on the lead. What is needed are harness that permit control of the animal without excessive pulling on the lead thereby, for example, permitting more effective training of the animal.

SUMMARY OF THE INVENTION

The present invention solves these problems with the prior art with a harness design that allows for a gentle tightening (cinching) of the harness around the animal's ribcage when the animal's lead is pulled by a person or the animal. This gentle tightening can be effectively used to train the animal, for example, not to pull or to obey other commands such as sit or stay. It is also effective in deterring the animal from escaping. Thus, the present invention is to an animal harness that reversibly tightens and relaxes when the lead is pulled and relaxed.

The harness of the present invention (the "tightening harness" or "cinching harness") achieves this goal by having a strap that is designed to bring both sides (the left side and the right side) of the harness together when the lead is pulled by a person or the animal pulls on the lead. The lead is attached to a strap (the "center strap") which, in turn is attached to a left side strap and right side strap (collectively referred to as the "two side straps"). The left side strap and right side straps are connected to the harness. When the center strap is pulled by the lead, the left side strap and right side strap are brought closer together causing the harness to gently constrict the animal.

In some aspects, the center strap is attached to the left side strap and the right side strap as well as a forward left side strap and a forward right side strap (collectively referred to as the "four side straps"). Thus, the center strap is attached to four straps, two on the left and two on the right, causing a broader area of constriction on the animal. In one aspect, the harness utilizing four side straps may be used for a larger animal (for example, a large dog) thereby allowing for greater control of the animal.

In one aspect the animal may be any animal or any sized animal. For example, the animal may be a dog, cat, ferret, skunk, etc. The present invention is not limited by the breed or species of animal. Also, the present invention is not limited by the size of the animal or the size of the harness. One of ordinary skill in the art, with the teaching of this specification, will be able to make a tightening harness of any appropriate size for any size animal.

In this regard, even though multiple sizes are contemplated for the tightening harness of the present invention, each harness, regardless of size, is adjustable over a finite range at the chest and ribcage of the animal. It is contemplated that the harness of the present invention is placed on the animal's back and, in one embodiment, secured under the animal's ribcage and at the animal's chest (i.e., behind and in front of the animal's forelegs). In other words, the left side and the right side of the harness of the present invention meet under the animal's ribcage and in front of the animal's chest. The mechanism of securing the harness may be selected from any means known to one of ordinary skill in the art and is not limited thereby. For example, the harness may be secured with hook and loop fastener, snaps, buckles, hooks, laces, etc. The portion of the harness that is located at the animal's chest may be secured with a chest strap. The chest strap may be secured with, for example, any of the above mentions devices.

The center strap of the tightening harness of the present invention is slidably attached to the two or four side strap(s) of the present invention. For example, it is contemplated that the center strap is slidably attached to each of the two or four straps by a ring which may be any suitable shape, for example, it may be round, D-shared (e.g., a D-ring) or, preferably, a rectangular-shaped ring (i.e., a rectangular ring). This attachment may be also referred to herein as a slidable coupler. The rectangular ring may have square corners or ends or rounded corners or ends. The rings may be made of plastic or, preferably, metal.

The lead may be attached to a ring on the center strap. The ring may be a round ring or a D-ring or any other suitable shape. The ring may be made of plastic of, preferably, metal. The ring that attaches the lead to the center strap may be slidably attached but need not be so.

Thus, the present invention contemplates an animal harness that tightens when the animal pulls, the harness comprising: providing: i) a fabric harness having openings for the animal's left and right forelegs, ii) a left side strap having an outboard end and an inboard end, iii) a right side strap having an outboard end and an inboard end and, iv) a first center strap having an attachment point for a leash or lead; wherein, the outboard end of the left side strap is attached to the harness near the opening for the left foreleg and outboard end of the right side strap is attached to the harness near the opening the right foreleg; wherein, the inboard end of the left side strap is coupled to the center strap with a first slidable coupler and the inboard end of the right side strap is coupled to the center strap with a second slidable coupler, the first and second slidable couplers allowing the center strap to freely slide therein; wherein, the center strap forms a loop and the attachment point for a leash or lead is positioned between the first slidable coupler and the second slidable coupler wherein, when the animal pulls, the center strap causes the inboard end of the left side strap and inboard end of the right side strap toward each other thereby causing the harness to tighten around the animal.

The present invention also contemplates that the harness of the present invention further comprises a left side and a right side that, when positioned on an animal's back, the left side and the right side are re-connectable at the animal's chest and at the animal's ribcage thereby leaving a left opening and a right opening for the animal's left and right forelegs to extend through.

The present invention also contemplates that the harness of the present invention further comprises a forward left side strap and a forward right side strap, wherein the center strap connects to the forward left side strap, the left side strap, the forward right side strap and the right side strap to form an X pattern with the center strap crossing over itself approximately centered between the forward left side strap, the left side strap, the forward right side strap and the right side strap and wherein the attachment point for the leash or lead is located where the center strap crosses over itself.

Alternatively, the present invention further comprises a forward left side strap and a forward right side strap, and a second center strap; wherein each center strap connects to one forward side strap and to the side strap at the opposite corner to the said forward side strap, and wherein each center strap crosses the other center strap form an X pattern approximately centered between the left side strap, the right side strap, the left forward side strap and the right forward side strap; and wherein the attachment point for the lead is located where the center straps cross each other.

The present invention also contemplates that the fabric of the harness of the present invention comprises a mesh fabric.

The present invention also contemplates that the attachment point for a leash or lead of the harness of the present invention is a D-ring.

The present invention also contemplates that the slidable couplers are rings or rectangular rings.

The present invention also contemplates that the harness is re-connectable at the animal's chest and ribcage with one of more of hook and loop fastener, buckles, hooks or snaps.

The present invention also contemplates a length adjustable, re-connectable chest strap, wherein the re-connectivity of the harness at the animal's chest is provided by the chest strap.

The present invention also contemplates that the harness will tighten on an animal when the leash or lead is pulled or when the animal pulls.

The present invention contemplates a method of retaining an animal on a lead, the method comprising: placing and securing the harness of the present invention on the animal to be retained and attaching a lead to the ring on the harness; wherein, when the animal pulls on the leash or lead or the leash or lead is pulled the harness tightens on the animal.

DETAILED DESCRIPTION OF THE INVENTION

The harness of the present invention is not limited by the material it is made from. One of skill in the art is familiar with materials suitable for use in harnesses. However, we list several preferred materials for use in the harness of the present invention here. The harness of the present invention, can be made from woven and non-woven materials. Woven materials may be synthetic fibers such as, but not limited to, nylon and polyester, etc., or natural fibers such, as but not limited to, cotton, wool, etc. Non-woven materials may be, but are not limited to, for example, leather or materials made from synthetic and natural fibers. The harness of the present invention may also be made of any combination of the above materials. The harness may be made from a synthetic mesh material.

The harness of the present invention is not limited by size. One of skill in the art will be able to make a harness of the present invention of the appropriate size for an animal such as, for example, a dog, cat ferret or skunk. Furthermore, the harness of the present invention is adjustable at the chest and ribcage of the animal via hook and loop fastener, buckles, snaps, buttons, etc.

The buckles and rings may be made of, for example, plastic or metal. The buckle may be, for example, a quick release and/or side release buckle or other suitable buckling mechanism known to one of skill in the art. The rings may be O-rings, D-rings or rectangular rings or other rings known to one of skill in the art. In one embodiment, the attachment device for the lead is a D-ring and the rings where the center strap attaches to the side straps are rectangular rings.

Figure 1:
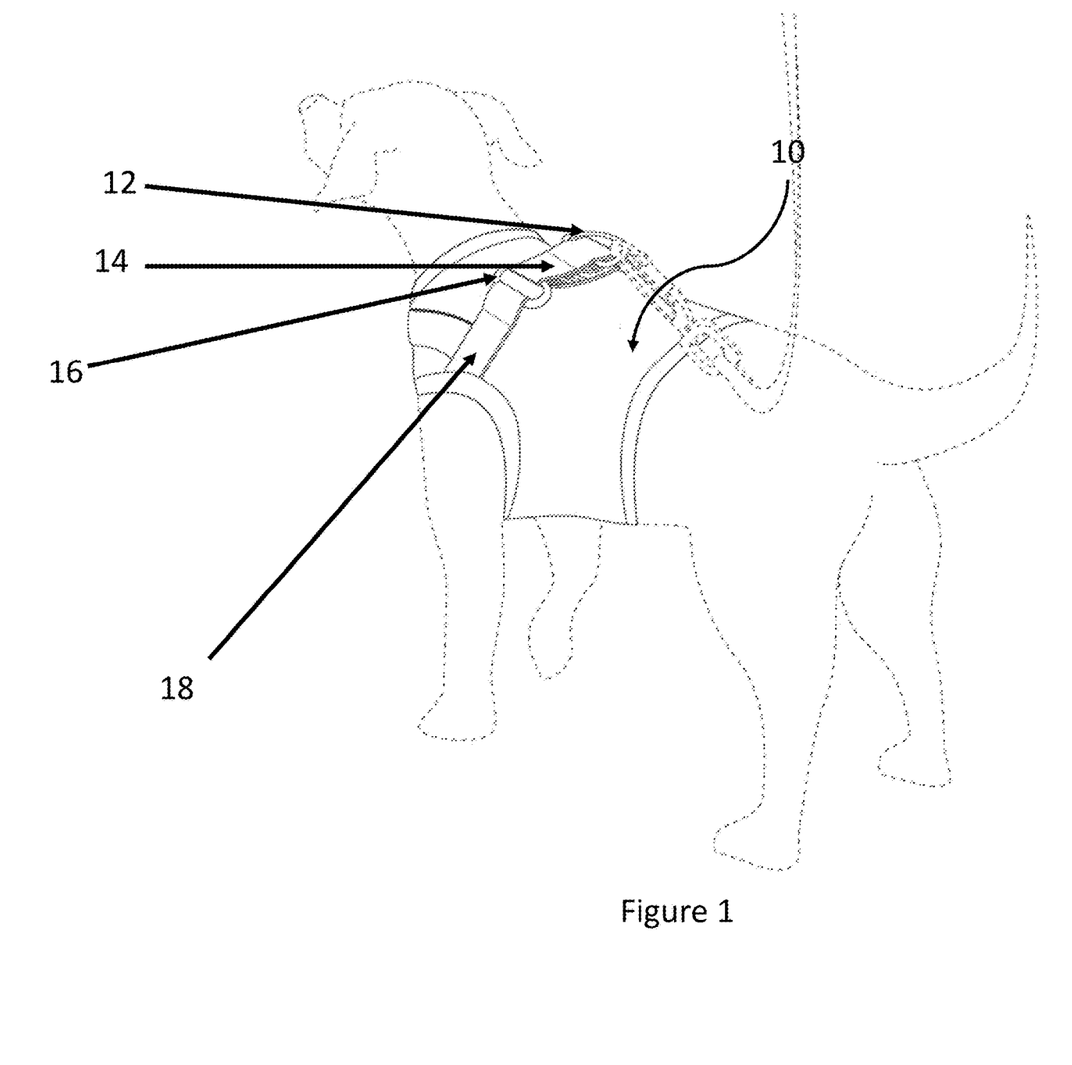
FIG. 1 shows the tightening harness of the present invention on an animal (a dog) with the harness and lead in a relaxed positon.

FIG. 1 shows an embodiment of the harness of the present invention 10. Shown are the attachment point for the leash 12, the center strap 14, the left leg strap 18 and a slidable connector 16 connecting the center strap to the left strap. The center strap passes through the attachment point for the lead. A similar arrangement is found on the right side of the harness. In this figure the lead is not being pulled and the harness is not being tightened around the animal.

Figure 2:
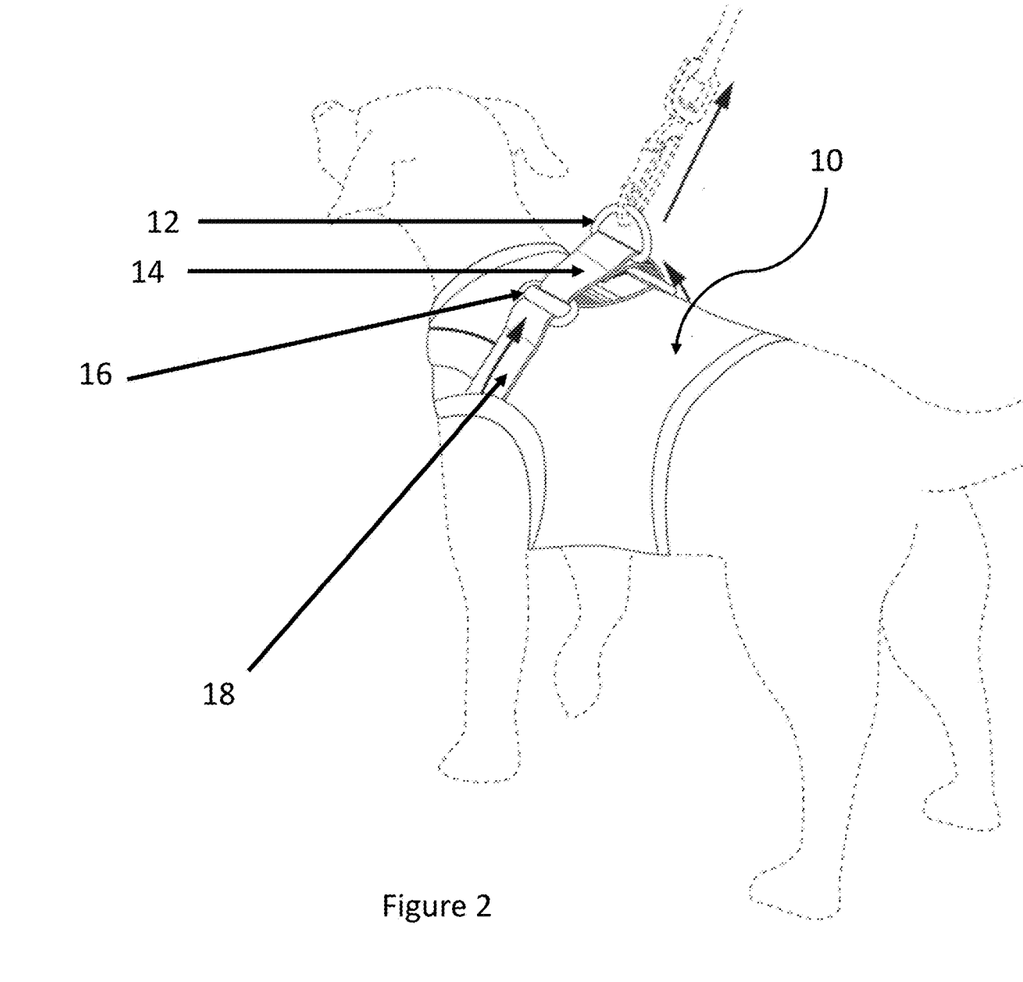
FIG. 2 shows the tightening harness of the present invention on an animal (a dog) with the harness and lead in a tightened or cinched positon. The unnumbered arrows indicate the direction of movement of the lead and harness side straps.

FIG. 2 shows the harness of FIG. 1 when the lead is being pulled. The unnumbered arrows with larger heads indicate the direction in which the leads is being pulled and how the side straps (left side strap is visible in the figure) is drawn both up and closer to the right side strap causing the harness to tighten on the animal. The numbering of the figure elements is the same as in FIG. 1.

Figure 3:
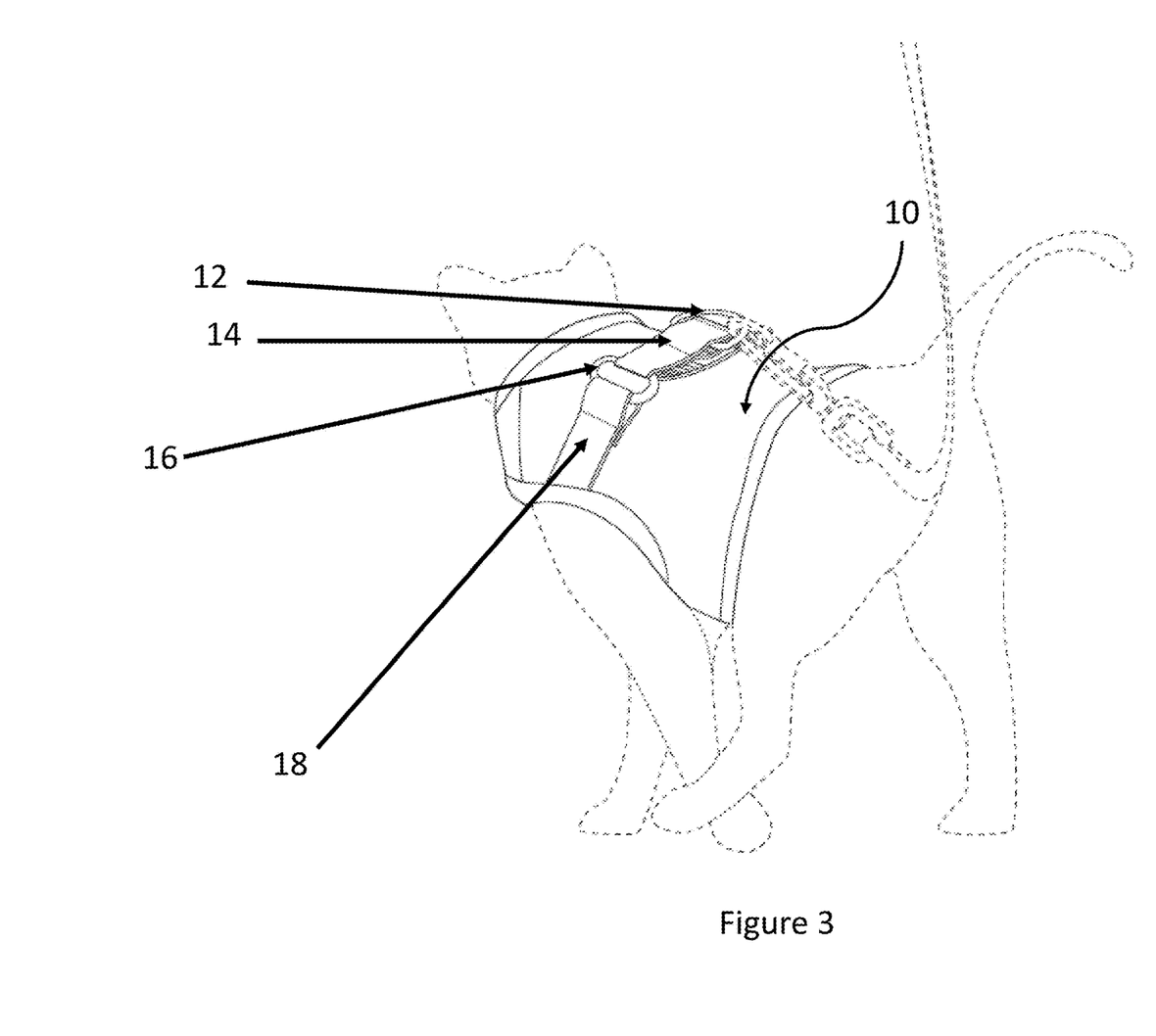
FIG. 3 shows the tightening harness of the present invention on an animal (a cat) with the harness and lead in a relaxed positon.

FIG. 3 shows a harness similar to that of FIG. 1 sized and cut for use with a smaller animal (for example a cat). In this figure the lead is not being pulled and the harness is not being tightened around the animal.

Figure 4:
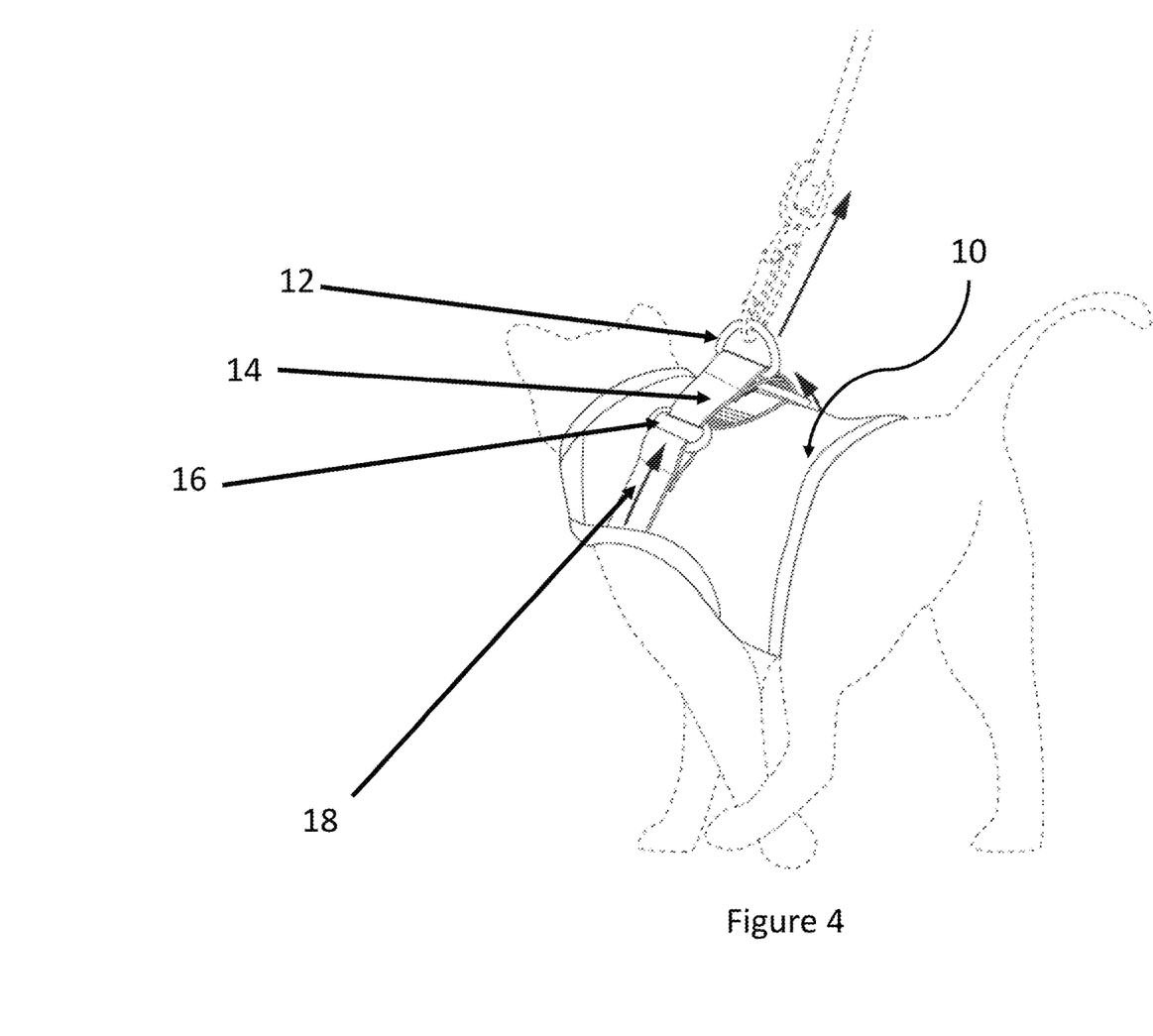
FIG. 4 shows the tightening harness of the present invention on an animal (a cat) with the harness and lead in a tightened or cinched positon. The unnumbered arrows indicate the direction of movement of the lead and harness side straps.

FIG. 4 shows a harness similar to that of FIG. 2 sized and cut for use on a smaller animal (for example, a cat). The unnumbered arrows with larger heads indicate the direction in which the leads is being pulled and how the side straps (left side strap is visible in the figure) is drawn both up and closer to the right side strap causing the harness to tighten on the animal. The numbering of the figure elements is the same as in FIG. 1.

Figure 5:
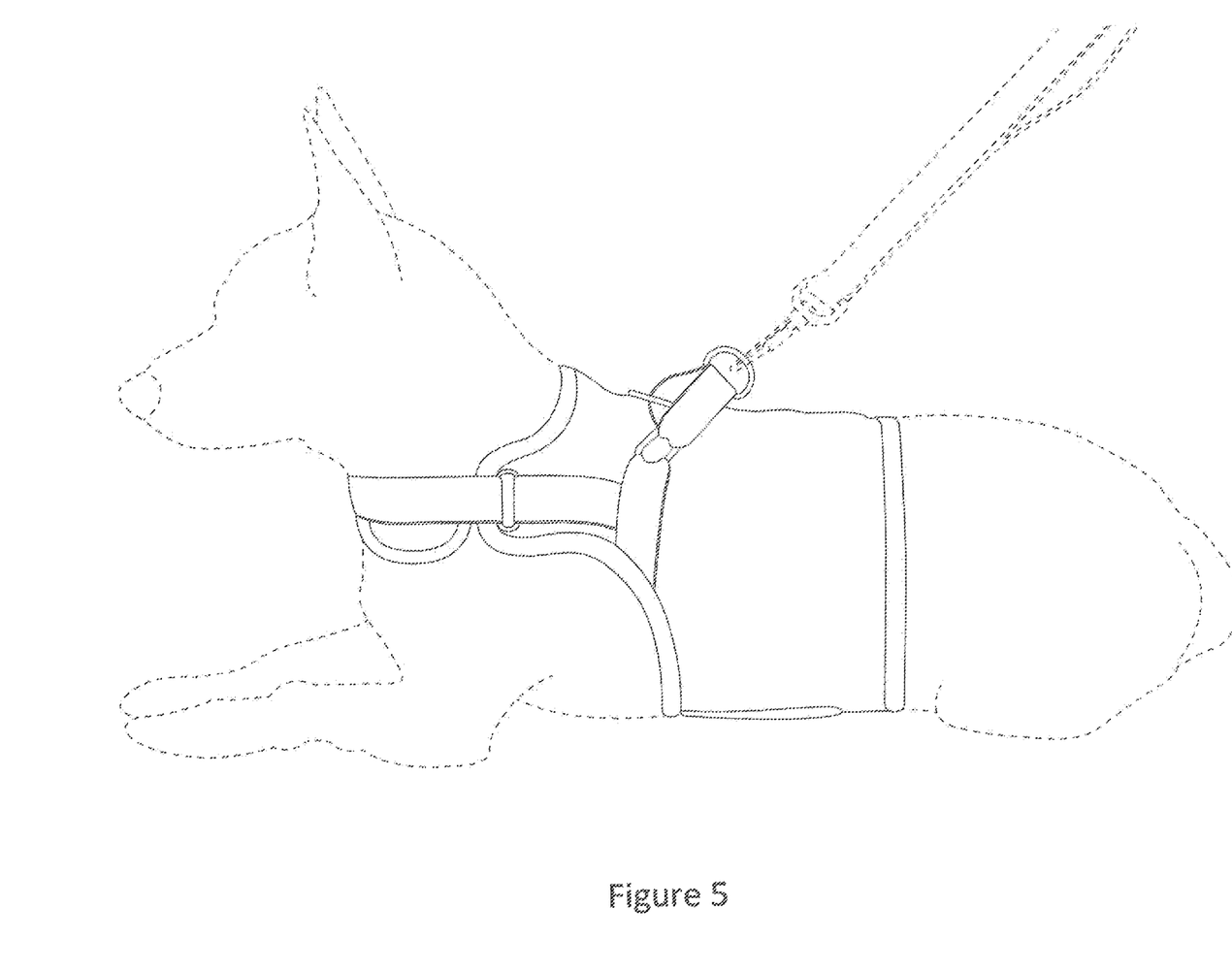
FIG. 5 is a photograph of an embodiment of the harness of the present invention where the harness is made of a synthetic mesh material.

FIG. 5 shows a photograph of the harness of the present invention in use on a dog.

Figure 6:
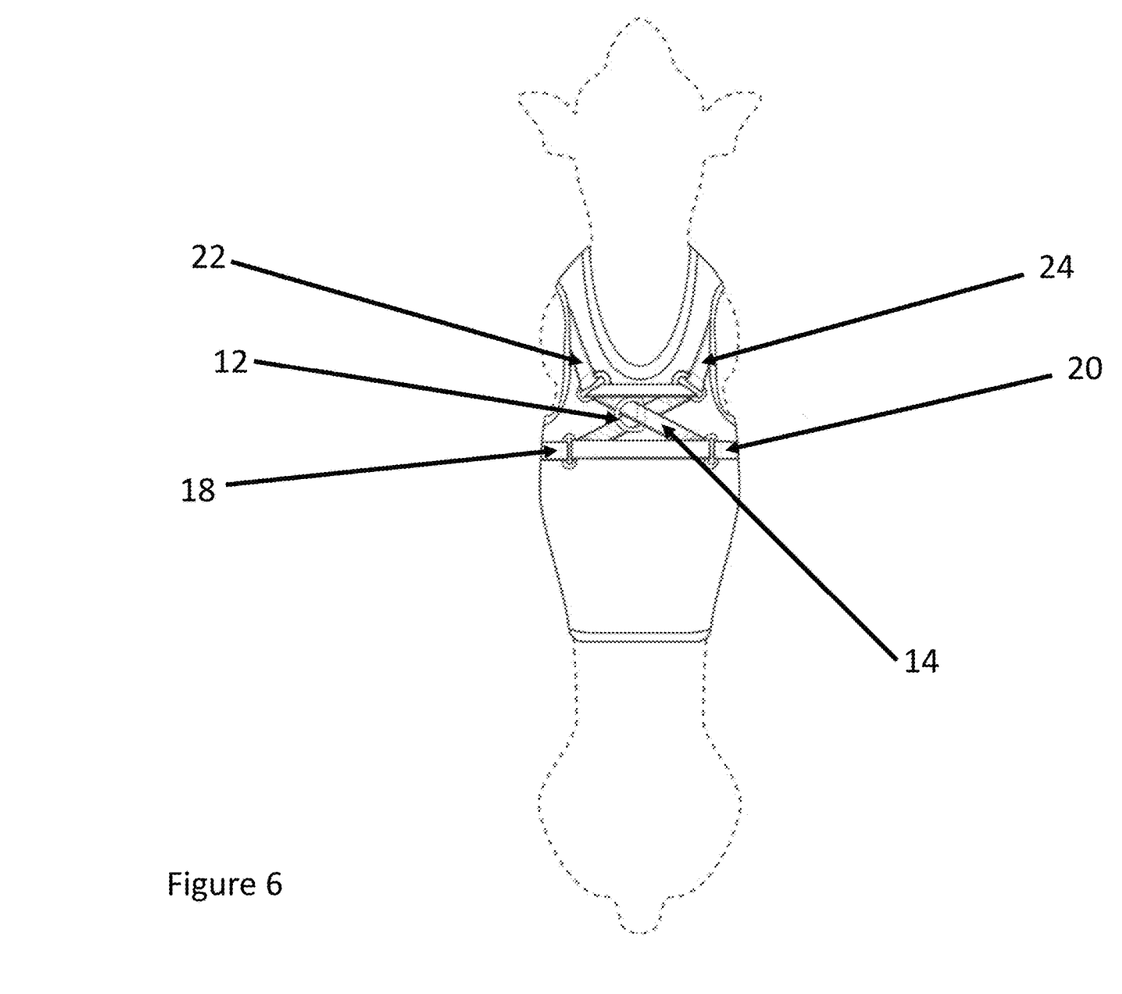
FIG. 6 shows the harness of the present invention having four side straps on an animal and an "X" crossed center strap.

FIG. 6 shows a variation of the harness of the present invention wherein the harness has a left side strap 18, a right side strap 20, a left forward side strap 22 and a right forward side strap 24. The center strap 14 connects with each of the four side straps with a slidable connector like the one illustrated in FIG. 1. The center strap crosses itself approximately centered between the four slidable connectors 26 (only one of the four slidable connectors are numbered as to not unnecessarily clutter the image) forming an "X". The center strap passes thought the attachment point for the lead 12 where the center strap crosses itself (i.e., at the "X") such that the attachment point for the lead wilt pull on both sections of the center strap forming the "X".

Figure 7:
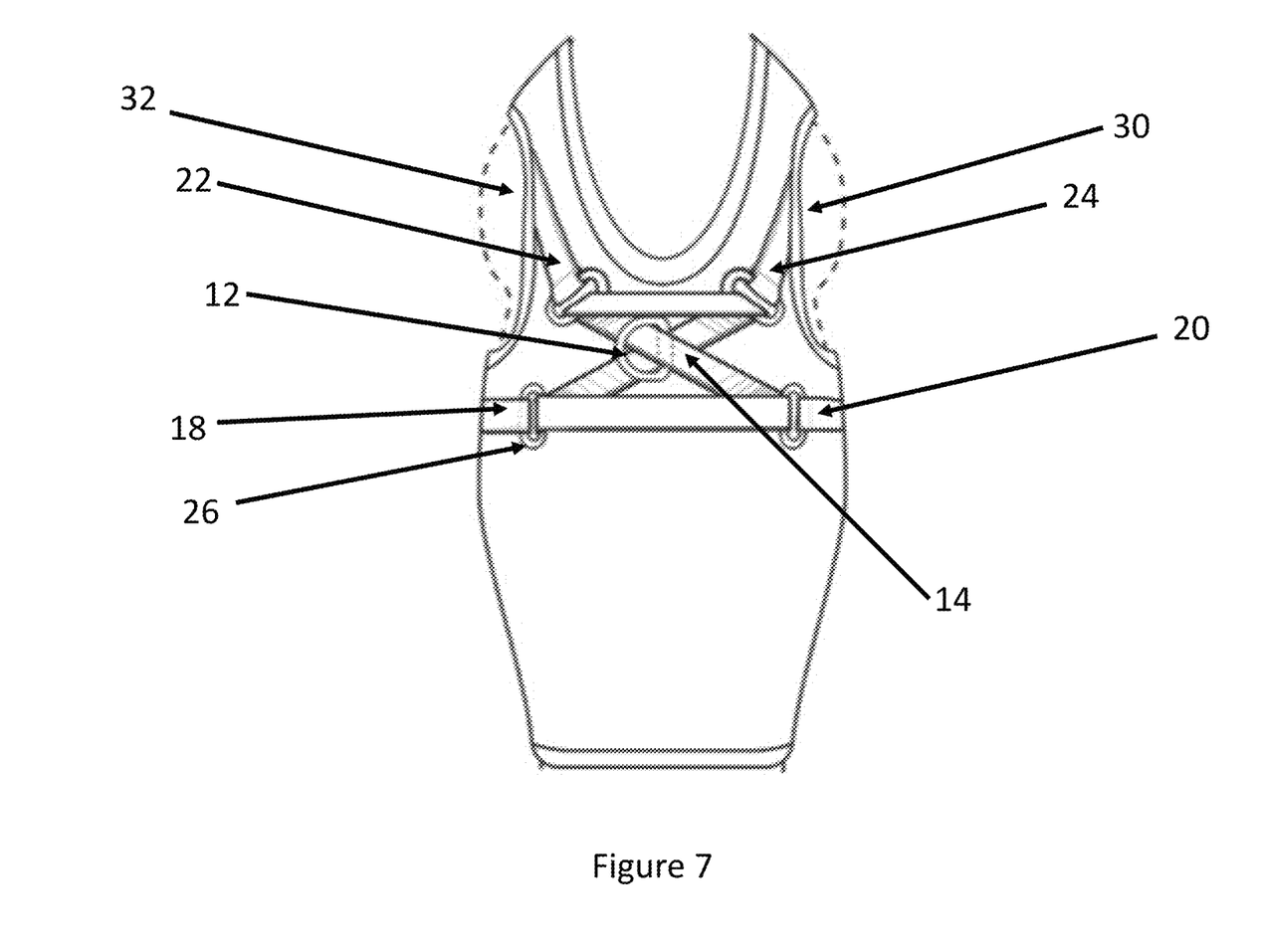
FIG. 7 shows a close-up of the harness of the present invention having four side straps and a single "X" crossed center strap.

FIG. 7 is a close-up of this variation of the harness of the present invention. Also numbered here are the openings for the animal's left 32 and right 30 forelegs. The animal's shoulders are represented as dashed lines.

Figure 8:
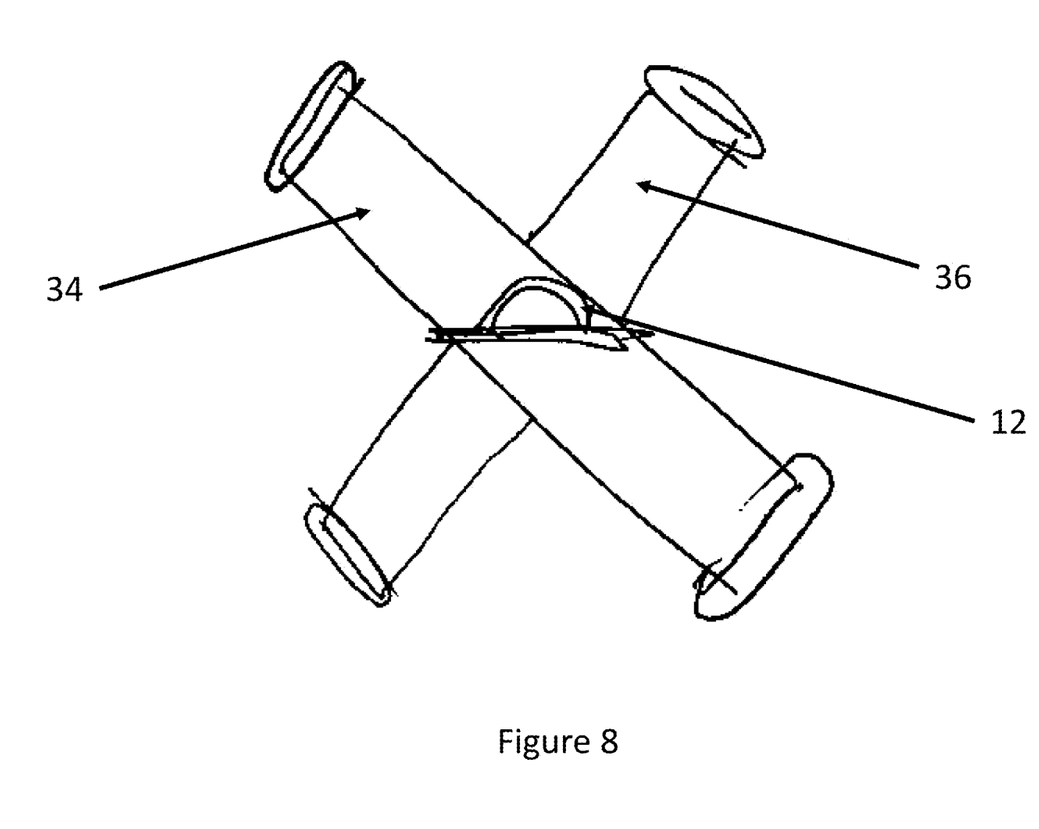
FIG. 8 shows a drawing of a close-up of the harness of the present invention and an "X" crossed center strap using two center straps.

FIG. 8 shows another variation of the harness of the present invention wherein two center straps (34 and 36) are utilized. Both center straps pass through the attachment point for the lead 12.

Figure 9:
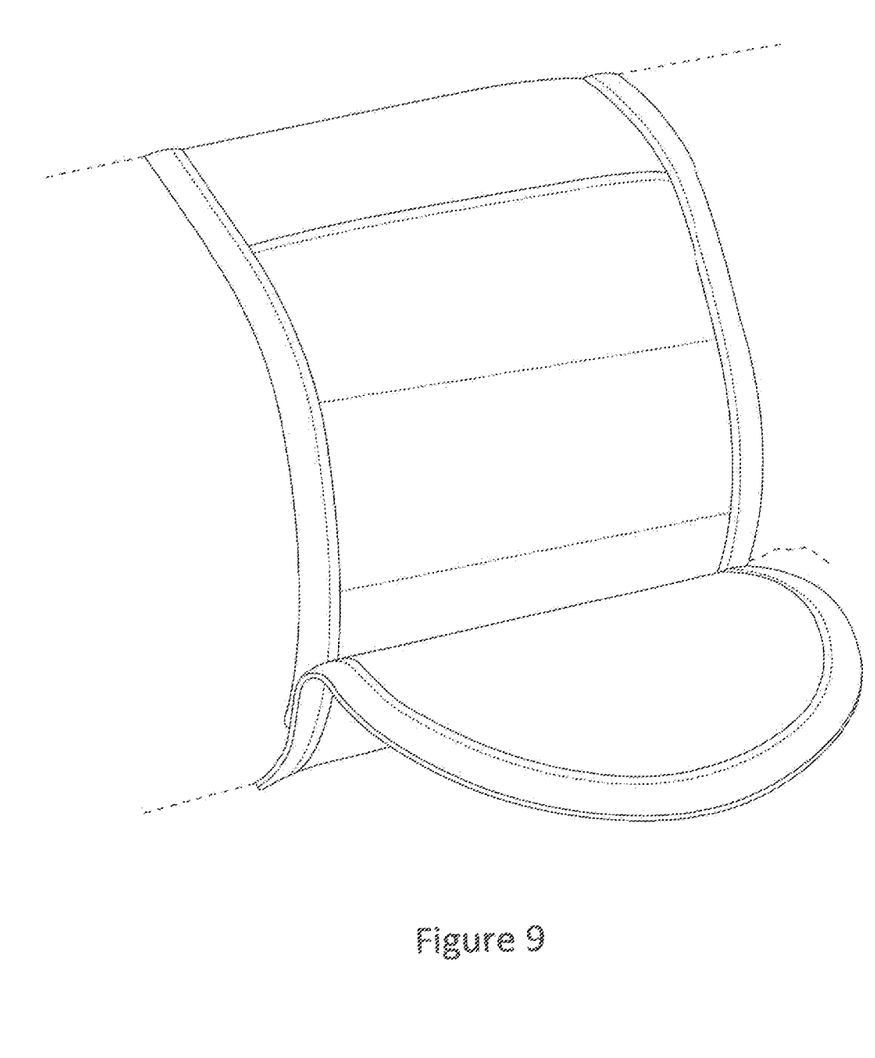
FIG. 9 is a photograph showing the harness is secured at the animal's rib cage with hook and loop fastener.

FIG. 9 is a photograph showing the harness of the present invention being secured under the animal's rib cage with hook and loop fastener.

Figure 10:
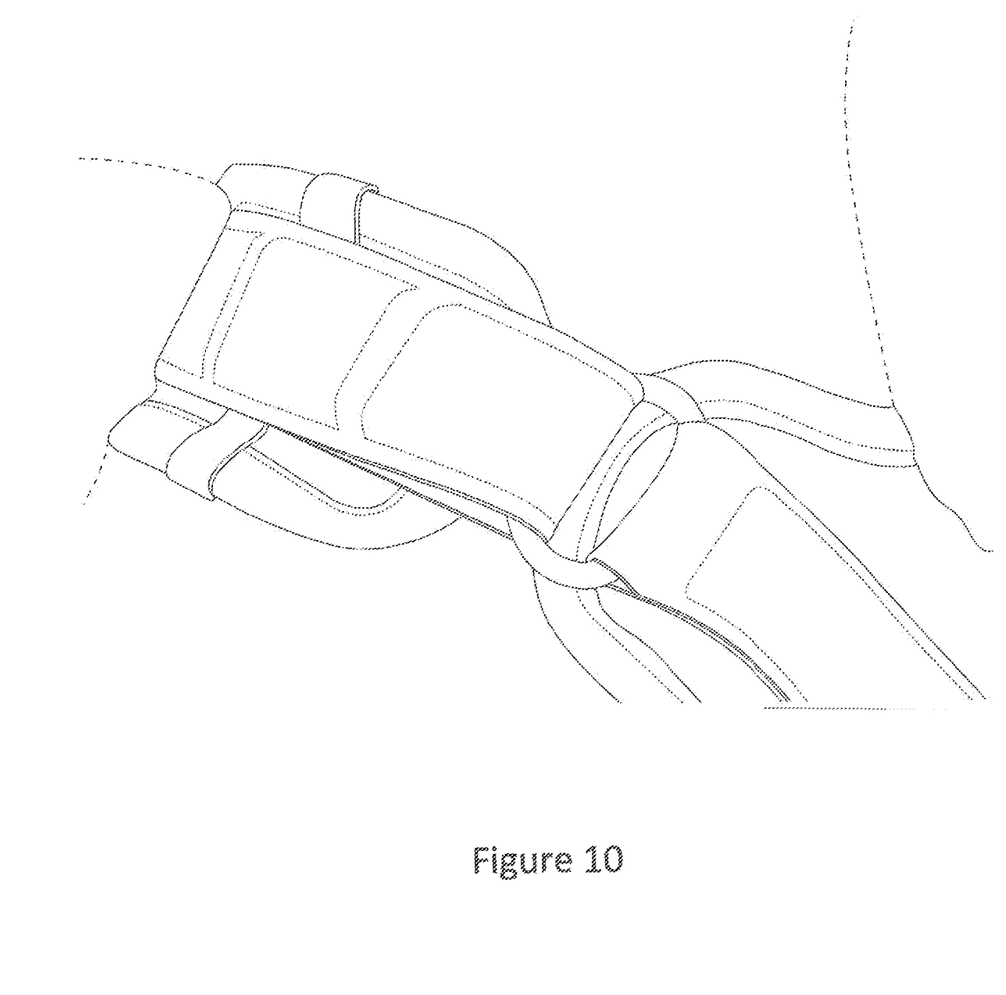
FIG. 10 is a photograph showing the harness secured at the animal's chest with hook and loop fastener.

FIG. 10 is a photograph showing the harness of the present invention fastened at an animal's neck with a strap that passes through a ring and then connects to itself with hook and loop fastener.

We claim:

1. An animal harness that tightens when the animal pulls, said harness comprising:
   a) i) a fabric harness having openings for the animal's left and right forelegs, ii) a left side strap having an outboard end and an inboard end, iii) a right side strap having an outboard end and an inboard end and, iv) a first center strap having an attachment point for a leash or lead, the first center strap being a continuous loop;
   b) wherein, the outboard end of the left side strap is attached to the harness near the opening for the left foreleg and outboard end of the right side strap is attached to the harness near the opening of the right foreleg;
   c) wherein, the inboard end of the left side strap is coupled to the center strap with a first slidable coupler and the inboard end of the right side strap is coupled to the center strap with a second slidable coupler, the first and second slidable couplers allowing the center strap to freely slide therein;
   d) wherein, the center strap forms a loop, wherein the ends of the center strap connect directly to each other, and the attachment point for a leash or lead is positioned between the first slidable coupler and the second slidable coupler;
   e) wherein, when the animal pulls, the center strap causes the inboard end of the left side strap and inboard end of the right side strap toward each other thereby causing the harness to tighten around the animal.

2. The harness of claim 1, further comprising a left side and a right side that, when positioned on an animal's back, the left side and the right side are re-connectable at the animal's chest and at the animal's ribcage thereby leaving a left opening and a right opening for the animal's left and right forelegs to extend through.

3. The harness of claim 1, further comprising a forward left side strap and a forward right side strap, wherein the center strap connects to the forward left side strap, the left side strap, the forward right side strap and the right side strap to form an X pattern with the center strap crossing over itself approximately centered between the forward left side strap, the left side strap, the forward right side strap and the right side strap and wherein the attachment point for the leash or lead is located where the center strap crosses over itself.

4. The harness of claim 1, further comprising a forward left side strap and a forward right side strap, and a second center strap; wherein each of the first and second center straps connects to one forward side strap and to the side strap at the opposite corner to the said forward side strap, and wherein the first center strap crosses the second center strap form an X pattern approximately centered between the left side strap, the right side strap, the left forward side strap and the right forward side strap; and wherein the attachment point for the lead is located where the center straps cross each other.

5. The harness of claim 1, wherein said fabric harness comprises a mesh fabric.

6. The harness of claim 1, wherein said attachment point for a leash or lead is a D-ring.

7. The harness of claim 1, wherein said couplers are rings.

8. The harness of claim 6, wherein said couplers are rectangular rings.

9. The harness of claim 1, wherein said harness is re-connectable at the animal's chest and ribcage with one of more of hook and loop fastener, buckles, hooks or snaps.

10. The harness of claim 1, further comprising a length adjustable, re-connectable chest strap, wherein the re-connectivity of the harness at the animal's chest is provided by the chest strap.

11. The harness of claim 1, wherein the harness will tighten on an animal when the leash or lead is pulled or when the animal pulls.

12. A method of retaining an animal on a lead, the method comprising:
   a) placing and securing the harness of claim 1 on the animal to be retained;
   b) attaching a lead to the ring on the harness;
      wherein, when the animal pulls on the leash or lead or the leash or lead is pulled the harness tightens on the animal.

13. The harness of claim 1, wherein said first center strap is a single continuous loop.

14. The harness of claim 6, wherein said attachment point for a leash or lead consists of a single D-ring.

15. The harness of claim 1, wherein the ends of the center strap connect to each other at the attachment point of the leash or lead.

* * * * *